(12) United States Patent
Ruellan et al.

(10) Patent No.: US 7,299,449 B2
(45) Date of Patent: Nov. 20, 2007

(54) DESCRIPTION OF AN INTERFACE APPLICABLE TO A COMPUTER OBJECT

(75) Inventors: Hervé Ruellan, Rennes (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 494 days.

(21) Appl. No.: 10/186,753

(22) Filed: Jul. 2, 2002

(65) Prior Publication Data
US 2003/0050942 A1 Mar. 13, 2003

(30) Foreign Application Priority Data
Jul. 2, 2001 (FR) .................................. 01 08771
Jul. 2, 2001 (FR) .................................. 01 08772

(51) Int. Cl.
*G06F 9/44* (2006.01)
(52) U.S. Cl. ..................................................... 717/116
(58) Field of Classification Search ........ 717/114–117, 717/136–143
See application file for complete search history.

(56) References Cited

U.S. PATENT DOCUMENTS

| 6,125,391 | A | 9/2000 | Meltzer et al. ............. 709/223 |
| 2002/0049790 | A1* | 4/2002 | Ricker et al. ................ 707/513 |
| 2002/0085020 | A1* | 7/2002 | Carroll, Jr. ................... 345/700 |

FOREIGN PATENT DOCUMENTS

EP    1 065 592 A1    1/2001

OTHER PUBLICATIONS

Mischkinsky, J., et al., "*Simple CORBA Object Access Protocol (SCOAP): A Discussion Paper—Presentation Slides,*" OMG Technical Committee Document—ORBOS/00-09-04 (Sep. 18, 2000), Burlingame, CA, USA, XP002203547.

Kyllingstad, R., et al., "*XML-Schema Based Semantic Representation: Design, Implementation and Usage,*" Diploma Thesis—Computer Systems Institute, Department of Computer Science, ETH (May 30, 2001), Zurich, XP002203548.

Jacobsen, H.-A., et al., "*Modeling Interface Definition Language Extensions,*" Proceedings 37th International Conference on Technology of Object-Oriented Languages and Systems, Tools-Pacific 2000, Sydney, NSW, Australia, pp. 242-251, Los Alamitos, CA, USA, IEEE Comput. Soc., USA, XP002203549.

Christensen, E., et al., "*Web Services Description Language (WSDL) 1.1,*" W3C Technical Recommendation (Mar. 15, 2001), XP002203550.

Tadashi Iijima, "Programming Languages which are specified by XML," The Journal of Information Processing Society of Japan, Jul. 24, 1998, vol. 98, No. 64, p. 53-60, abstract only.

Noribide Shinagawa et al., "A Processing Model of Foreign Functions in An eXtensible XML Query Language $X^2QL$," The Journal of Information Processing Society of Japan, Jul. 28, 2000, vol. 2000, No. 69, p. 153-160, abstract only.

\* cited by examiner

*Primary Examiner*—Tuan Dam
*Assistant Examiner*—John J Romano
(74) *Attorney, Agent, or Firm*—Fitzpatrick, Cella, Harper & Scinto

(57) ABSTRACT

The invention concerns a method of describing a function applicable to a computer object, the function being invocable in a first markup language, the function being initially expressed in a predetermined programming language different from the first markup language, characterised in that it includes the steps of:
defining (E3) a first tag describing the function, in the first markup language,
defining (E6) second tags describing the arguments of the function, these tags being contained in the first tag describing the function and the types of the arguments being expressed in a second markup language,
and, if the function produces a result,
defining (E10) a third tag describing the result of the function, this tag being contained in the first tag describing the function and the type of the result being expressed in the second markup language.

10 Claims, 12 Drawing Sheets

Figure 4a

400a
```
<image interface="http://www.crf.canon.fr/imageInterface.xsd">
    <name>Flower</name>
    <preview>00FFA0...</preview>
</image>
```

410a
```
<interface
      name="imageInterface"
      href="http://www.crf.canon.fr/imageInterface.xsd"
      xmlns:xs="http://www.w3.org/2001/XMLSchema"/>
    <getDimension>
        <dimension out="true">
            <xs:complexType>
                <xs:element name="width" type="xs:integer"/>
                <xs:element name="height" type="xs:integer"/>
            </xs:complexType>
        </dimension>
    </getDimension>                                                        411a
    <setDimension>
        <dimension>
            <xs:complexType>
                <xs:element name="width" type="xs:integer"/>
                <xs:element name="height" type="xs:integer"/>
            </xs:complexType>
        </dimension>
    </setDimension>                                                        412a
    <rotate>
        <angle type="xs:integer/>
    </rotate>                                                              413a
</interface>
```

420a
```
<getDimension xmlns="http://www.crf.canon.fr/imageInterface.xsd">
</getDimension>
```

430a
```
<dimension xmlns="http://www.crf.canon.fr/imageInterface.xsd">
    <width>640</width>
    <height>480</height>
</dimension>
```

440a
```
<rotate xmlns="http://www.crf.canon.fr/imageInterface.xsd">
    <angle>45</angle>
</rotate>
```

Figure 4b

```
<image interface="http://www.crf.canon.fr/imageInterface.xsd">
    <name>Flower</name>
    <preview>00FFA0...</preview>
</image>
```
400b

```
<xsd:schema xmlns:xsd="http://www.w3.org/2001/XMLSchema"
    xmlns="http://www.crf.canon.fr/imageInterface.xsd"
    targetnamespace:image="http://www.crf.canon.fr/imageInterface.xsd">
    <!-- Generic definitions. -->
    <xsd:complexType name="function"/>
    <xsd:attribute name="resultType" type="xsd:NCName"/>

<!-- Function call declaration for: getWidth -->
    <xsd:element name="getWidth" image:resultType="width">
        <xsd:complexType>
            <xsd:complexContent>
                <xsd:extension base="image:function"/>
            </xsd:complexContent>
        </xsd:complexType>
    </xsd:element>

<!-- Function result declaration for: getWidth -->
    <xsd:element name="width" type="xsd:integer"/>

<!-- Function call declaration for: getDimension -->
    <xsd:element name="getDimension" image:resultType="dimension">
        <xsd:complexType>
            <xsd:complexContent>
                <xsd:extension base="image:function"/>
            </xsd:complexContent>
        </xsd:complexType>
    </xsd:element>

<!-- Function result declaration for: getDimension -->
    <xsd:element name="dimension">
        <xsd:complexType>
            <xsd:sequence>
                <xsd:element name="width" type="xsd:integer"/>
                <xsd:element name="height" type="xsd:integer"/>
            </xsd:sequence>
        </xsd:complexType>
    </xsd:element>

<!-- Function call declaration for: rotate -->
    <xsd:element name="rotate">
        <xsd:complexType>
            <xsd:complexContent>
                <xsd:extension base="image:function">
                    <xsd:element name="angle" type="xsd:integer"/>
                </xsd:extension>
            </xsd:complexContent>
        </xsd:complexType>
    </xsd:element>
</xsd:schema>
```
410b, 411b, 412b, 413b, 414b

```
<getDimension xmlns="http://www.crf.canon.fr/imageInterface.xsd">
</getDimension>
```
420b

```
<dimension xmlns="http://www.crf.canon.fr/imageInterface.xsd">
    <width>640</width>
    <height>480</height>
</dimension>
```
430b

```
<rotate xmlns="http://www.crf.canon.fr/imageInterface.xsd">
    <angle>45</angle>
</rotate>
```
440b

Figure 5

| URI object | Object | URI interface |
|---|---|---|
| URI200 | O200 | URI200' |
| URI201 | O201 | URI200' |
| URI201 | O201 | URI201' |
| . | . | . |
| . | . | . |
| . | . | . |

| URI interface | XML Schema | Interface |
|---|---|---|
| URI200' | i200.xsd | I200 |
| URI201' | i201.xsd | I201 |
| . | . | . |
| . | . | . |
| . | . | . |

| URI interface | XML Schema | Interface |
|---|---|---|
| URI200' | i200.xsd | I200 |
| URI201' | i201.xsd | I201 |
| URI202' | i202.xsd | I202 |
| ⋮ | ⋮ | ⋮ |

Tc'

Tc'700    Tc'701    Tc'702

DESCRIPTION OF AN INTERFACE APPLICABLE TO A COMPUTER OBJECT

DESCRIPTION OF AN INTERFACE APPLICABLE TO A COMPUTER OBJECT

The present invention generally relates to the description of an interface applicable to a computer object. In a first aspect of the invention, the description of the interface is in a markup language. In a second aspect of the invention, the description of the interface is in a schema language associated with a markup language.

In an object oriented system, the computer object is an element comprising data, also known as attributes, and functions or method which may possibly use parameters or input arguments. Typically, these functions may be called or invoked in order to manipulate the data of the object.

An interface is a set of functions applicable to an object.

A known markup language will be considered more particularly below. In this case it is the XML (Extended Markup Language) language.

This language is defined by a well-known standard: the XML standard.

The XML standard defines a syntax enabling documents to be structured with the use of tags bounded by the signs <and> (for example: <tag>). These tags are grouped together by pairs of opening and closing tags (<tag> and </tag>). An XML tag is an element constituted by an opening tag, the corresponding closing tag, as well as the whole of the content bounded by these tags. This content is composed of other elements and/or pure text. A tag without content can be represented by an empty tag <tag/>. An XML document is constituted by a principle element.

A schema language enables a markup language to be described. Thus, an XML schema language enables an XML language to be described. Several XML schema languages exist and are known in the art.

A document written in an XML schema language is commonly called an XML schema. An XML schema describes the structure of a set of XML documents. An XML schema is the description of the tags authorized in a document conforming to this XML language and of their possible nesting. An XML document respecting the structure defined by an XML schema is said to be valid with respect to this XML schema.

In this context, the French patent application No. 99 08155 filed by the present applicant describes a method of remote execution of a function on a computer object in a computer network. More particularly, this document proposes a method of describing the interfaces of an object based on an XML language. The XML language used is specific to this application and only provides a limited set of possible types for the input and output parameters of the functions.

Moreover, a specification written by the IBM and Microsoft companies, called WSDL (Web Services Description Language) provides a method of describing services using XML syntax. A service is characterized by the description of the document which it receives as input and by the document which it produces as output. These documents are XML documents of which the structure can typically be described by XML schemas.

It should be noted that this specification does not use the notion of object. The XML schema language is used according to its known function, that is to say to describe the structure of XML documents. Within this specification, the documents described are documents processed and produced by a service.

Furthermore, the United States patent U.S. Pat. No. 6,125,391 describes the use of documents for carrying out transactions between commercial partners via a network. In a similar manner to the WSDL specification, a transaction is described by its input and output documents.

Here too, the notion of object is not used and the XML schema language is used according to its known function, that is to say to describe the structure of XML documents.

The present invention aims to remedy the drawbacks of the prior art, by providing a method and a device for describing a function applicable to a computer object.

In the first aspect of the invention, the inventors have worked more particularly on the markup language. Thus, the invention proposes a method of describing a function applicable to a computer object, the function being invocable in a first markup language, the function being initially expressed in a predetermined programming language different from the first markup language, characterised in that it includes the steps of:
defining a first tag describing the function, in the first markup language,
defining second tags describing the arguments of the function, these tags being contained in the first tag describing the function and the types of the arguments being expressed in a second markup language,
and, if the function produces a result,
defining a third tag describing the result of the function, this tag being contained in the first tag describing the function and the type of the result being expressed in the second markup language.

Correlatively, the invention concerns a device for describing a function applicable to a computer object, the function being invocable in a first markup language, the function being initially expressed in a predetermined programming language different from the first markup language, characterised in that it has:
means of defining a first tag describing the function, in the first markup language,
means of defining second tags describing the arguments of the function, these tags being contained in the first tag describing the function and the types of the arguments being expressed in a second markup language,
and, if the function produces a result,
means of defining a third tag describing the result of the function, this tag being contained in the first tag describing the function and the type of the result being expressed in the second markup language.

By virtue of the invention, a single interpreter capable of processing the markup language is necessary for processing an interface.

In addition, an interface can easily be read by a user whilst offering a great variety of possible types.

In particular when the first markup language is an XML language and the second markup language is an XML schema language associated with the XML language, the typing part of the XML schemas is preserved.

Finally, it is not necessary to have a complex processor for processing an interface according to the invention. For example, the invention can be used on a communicating diary, known as a PDA, or a portable telephone.

According to alternative preferred characteristic
the second markup language is a schema language associated with the first markup language, or the second markup language is a markup language which makes it possible to construct complex types by aggregation of predefined simple types.

The second language thus procures either the advantages of a schema language, or an even more simple implementation in which only new complex types can be created.

According to a preferred characteristic, the third tag is differentiated from the second tags by an attribute with a specific value.

Thus a result is easily identifiable.

According to another preferred characteristic, at least one function forming part of an interface, the interface is stored in the markup language and in the programming language.

The description device has means of implementing the above characteristics.

The invention also concerns a method of obtaining, by a client terminal, an interface of an object, said interface having at least one function described by the method presented above, characterised in that it includes the translation of said interface into a programming language different from the markup language.

According to a preferred characteristic, the obtaining method includes the storage of the interface in the markup language and in the programming language.

The invention also concerns an obtaining device having means of implementing the above characteristics.

According to a preferred characteristic, the markup language is an XML language and the associated schema language is the XML schema language described by the standard "XML Schema".

The description device, the obtaining method and device have advantages similar to those previously presented.

In the second aspect of the invention, the inventors have worked on a schema language associated with a markup language. Thus, the invention provides a method of describing a function applicable to a computer object, it being possible to invoke the function in a markup language, the function being initially expressed in a predetermined programming language different from the markup language, characterized in that it comprises the steps of:

defining an element describing the function, in a schema language associated with the markup language, defining the arguments of the function, in said schema language, and, if the function produces a result, defining the element describing the result of the function, in said schema language.

Correlatively, the invention relates to a device for describing a function applicable to a computer object, it being possible to invoke the function in a markup language, the function being initially expressed in a predetermined programming language different from the markup language, characterized in that it comprises:

means for defining an element describing the function, in a schema language associated with the markup language, means for defining the arguments of the function, in said schema language, and, if the function produces a result, means for defining the element describing the result of the function, in said schema language.

By virtue of the invention, the functions are described with the use of a schema language which is a standard language, and this enables the use of all the existing tools for dealing with this language.

The design and programming of an interface are simplified.

In particular, it is possible to define new types of elements, to validate the invocation of functions, these functions making it possible to perform processing operations, for example on images, which were previously complex, if not difficult, to carry out.

According to preferred features and alternatives, when a function produces a result, the definition of an element describing an invocation of that function comprises a specific attribute for indicating which element describes the result of that invocation or a relationship is established between an element describing an invocation of that function and the element describing its result by means of documentary elements of the schema language. Thus, an invocation of a function and its result are linked.

According to a preferred feature, the definition of an element of a function has a particular type which makes it possible to characterize this element as describing a function.

According to another preferred feature, with at least one function forming part of an interface, the invention comprises the storage in memory of the interface in the schema language and in the programming language.

The describing device comprises means for implementing the above features.

The invention also concerns a method for obtaining an interface of an object by a client terminal, said interface comprising at least one function described by the description method already set out, characterized in that it comprises the translation of said interface into a programming language that is different to the schema language.

According to a preferred feature, the obtaining method comprises the storage in memory of the interface in the schema language and in the programming language.

According to a preferred feature, the markup language is an XML language and the associated schema language is an XML schema language. The XML schemas make it possible to validate the documents containing the function invocations and the documents containing the function results.

The invention also relates to an obtaining device comprising means for implementing the above features.

The describing device and the obtaining method and device have similar advantages to those already set out.

The invention also relates to a computer including the device according to the invention, or means for implementing the method according to the invention. The advantages of the computer are identical to those already disclosed.

The invention also relates to an information storage means, which can be read by a computer or microprocessor, integrated or not integrated into the device, and possibly removable, stores a program implementing the method according to the invention.

The invention also relates to a computer program readable by a microprocessor and comprising one or more sequences of instructions is capable of implementing the methods according to the invention.

The characteristics and advantages of the present invention will appear more clearly from a reading of a preferred embodiment illustrated by the accompanying drawings, in which.

Figure 3:
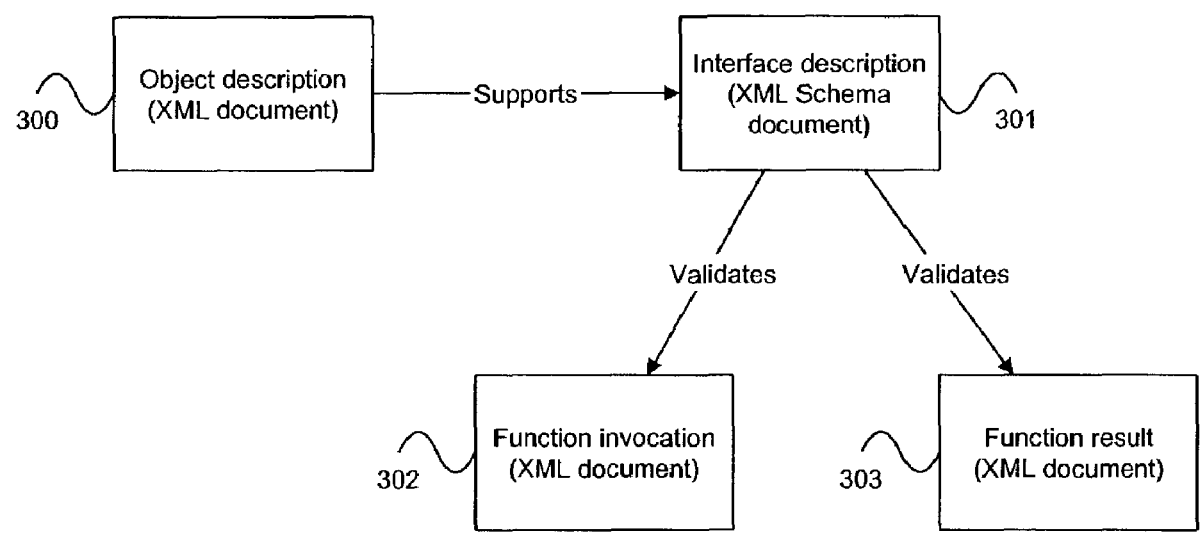
Figure 7A:
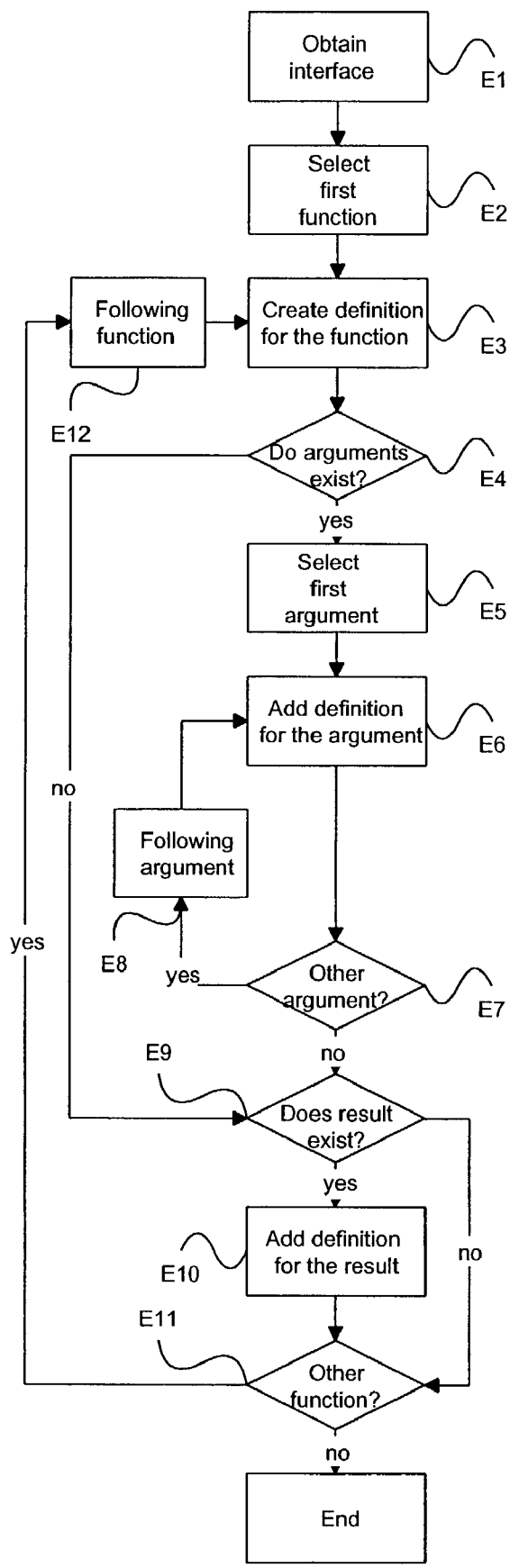
Figure 7B:
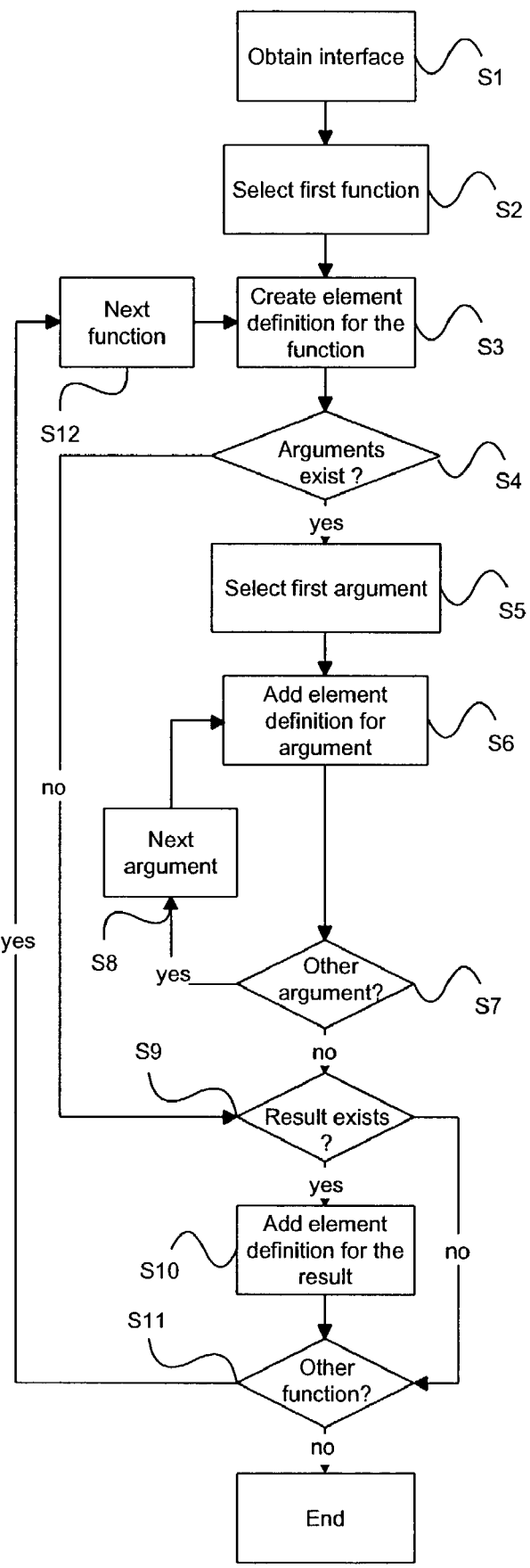
Figure 8A:
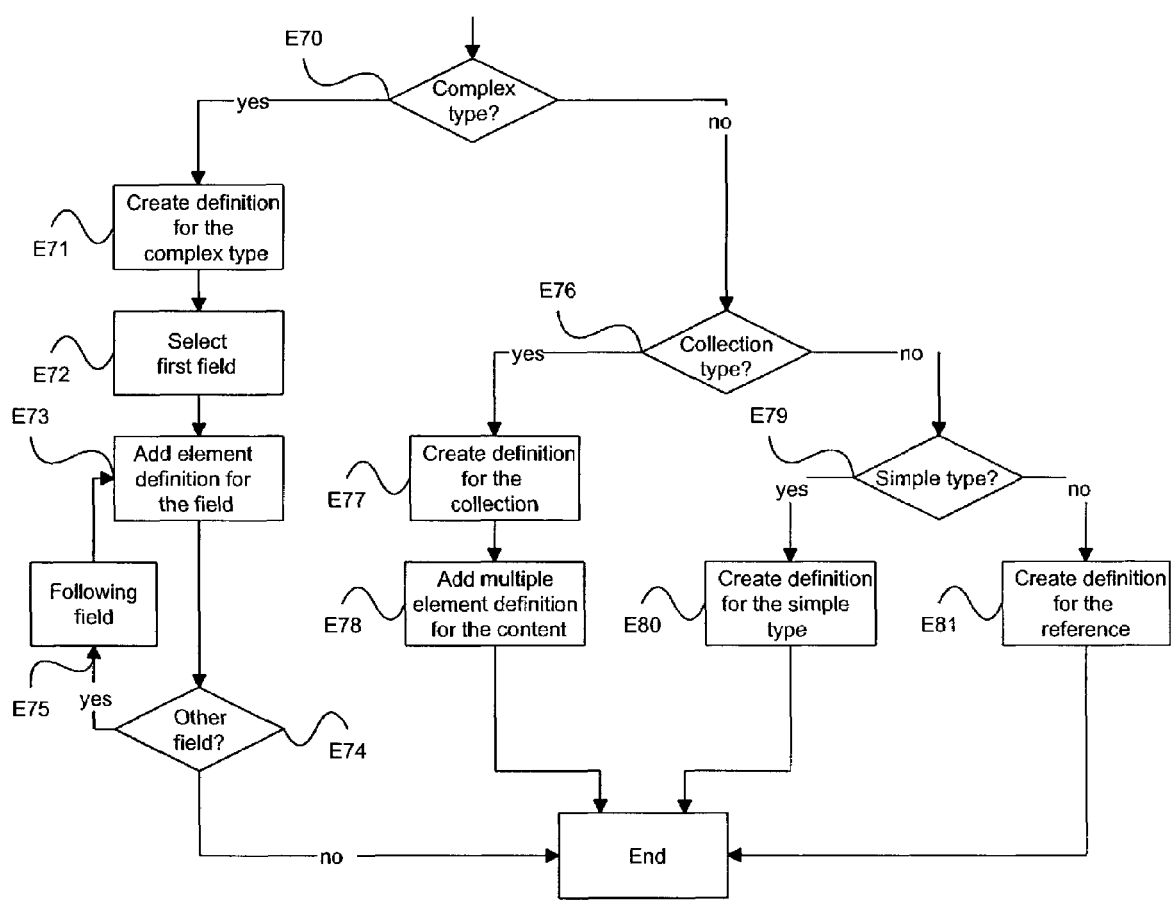
Figure 8B:
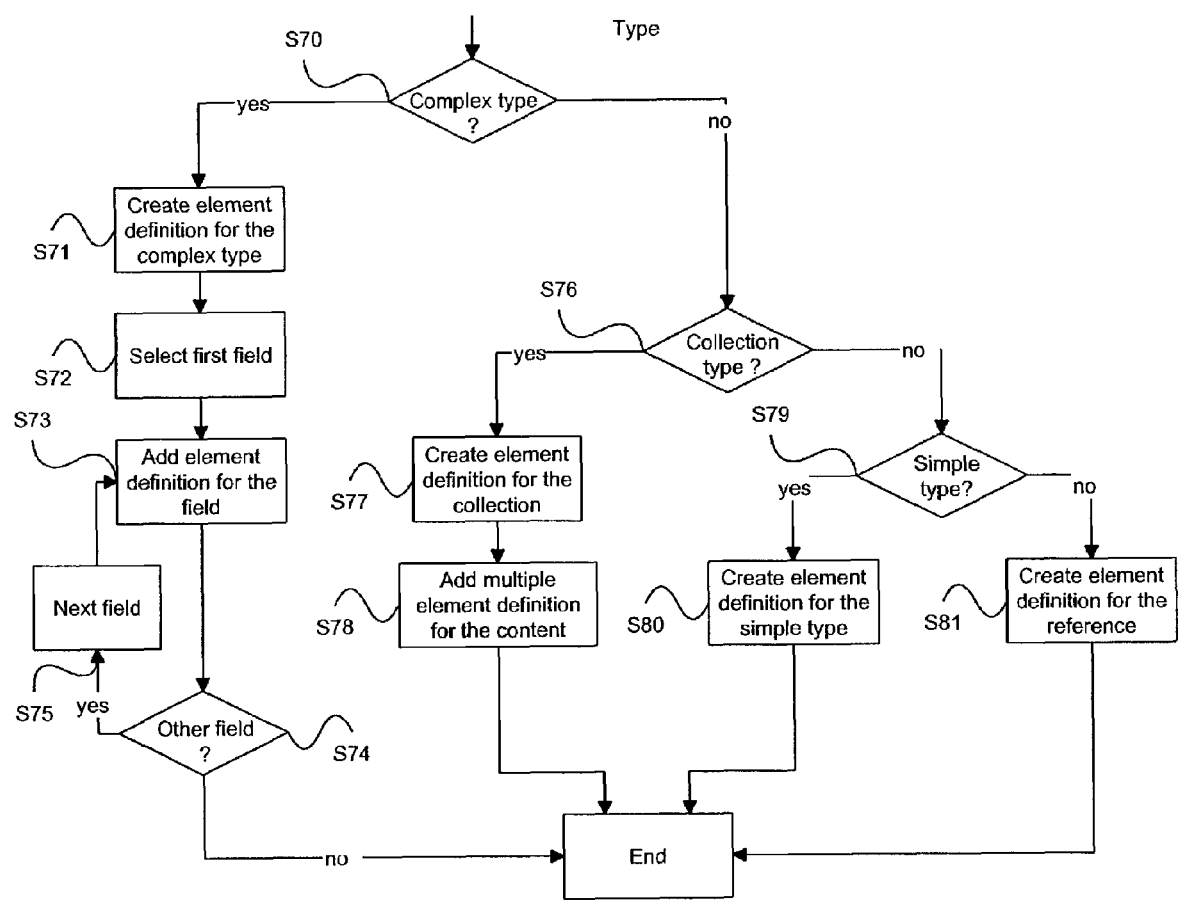
Figure 10:
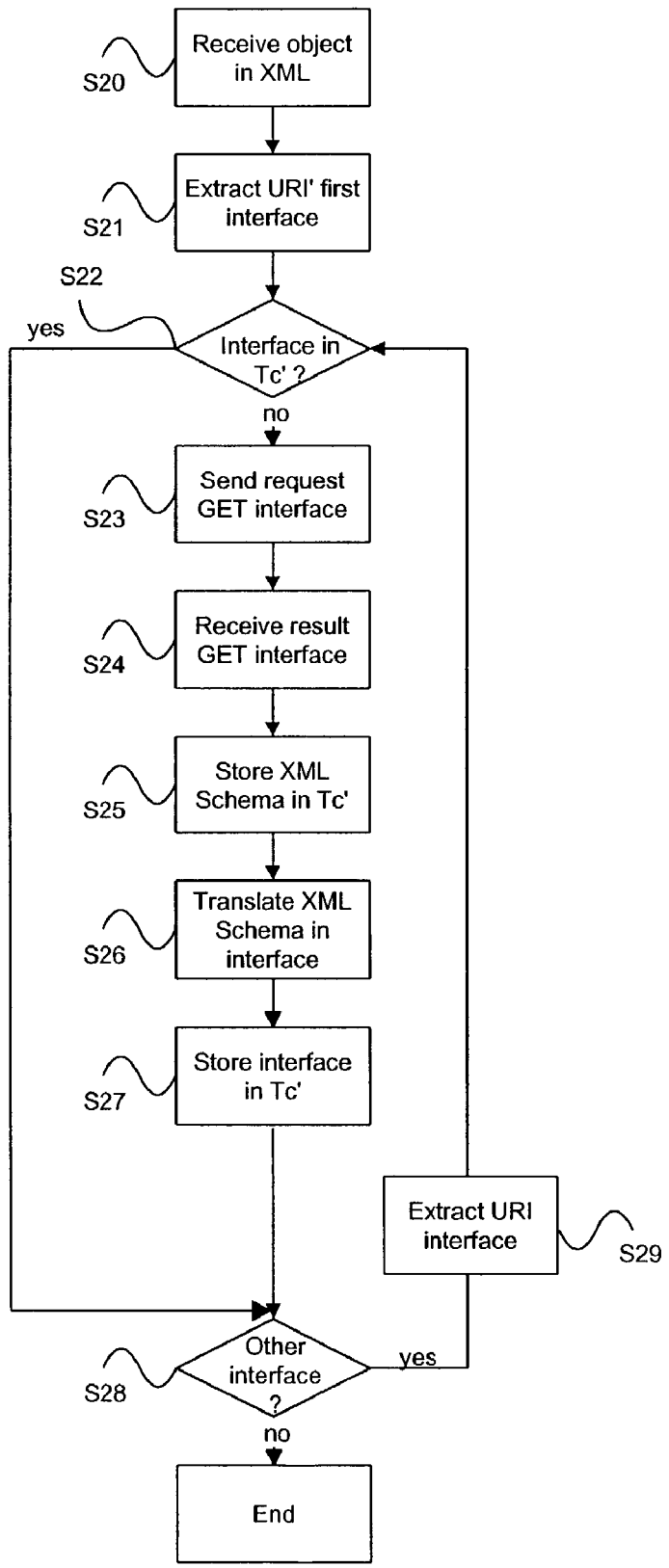

FIG. 3 is a diagram of the relationships between documents, according to the invention, FIG. 4a shows examples of documents used according to the first aspect of the invention, FIG. 4b shows examples of documents used according to the second aspect of the invention, FIGS. 5 and 6 show tables stored in memory in a computer server, according to the invention, FIG. 7a represents an embodiment of a method according to the first aspect of the invention, FIG. 7b represents an embodiment of a method according to the second aspect of the invention, FIG. 8a represents an embodiment of a method for generating a representation of a type of data in XML schema language, according to the first aspect of the invention, FIG. 8b represents an embodiment of a method for generating a representation of a type of data in XML schema language, according to the second aspect of the invention, FIG. 9 represents a table stored in memory in a client computer, according to the invention, FIG. 10 represents an embodiment of a method for obtaining the interfaces of an object by a computer client.

Figure 1:
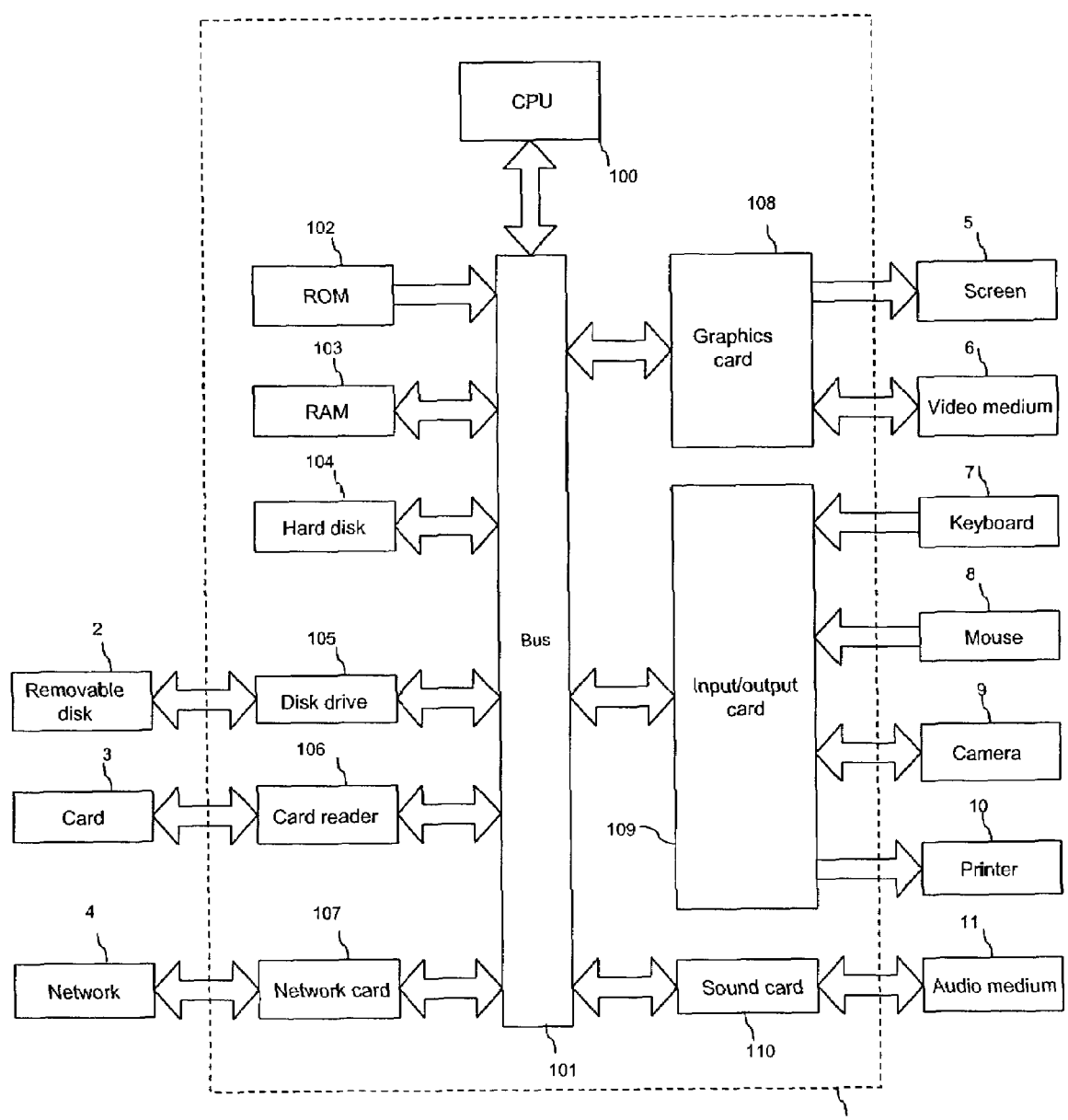
FIG. 1 is an embodiment of a device implementing the invention.

According to the embodiment chosen and represented in FIG. 1, a device implementing the invention is for example a microcomputer 1 connected to different peripherals. This computer may be a client or a server, in the context of the invention.

The device 1 comprises a network card 107 connected to a network 4 capable of transmitting digital data to be processed or conversely of transmitting data processed by the device. The device 1 also comprises a storage means 104 such as a hard disk. It also comprises a drive 105 for a disk 2. This disk 2 may be a diskette, a CD-ROM, or a DVD-ROM, for example. The disk 2 like the hard disk 104 can contain data processed according to the invention as well as the program or programs implementing the invention which, once read by the device 1, will be stored on the hard disk 104. According to a variant, the program enabling the device to implement the invention can be stored in read-only memory 102 (referred to as ROM in the drawing). In a second variant, the program can be received in order to be stored in an identical fashion to that described previously via the communication network 4.

The device 1 comprises a card reader 106 able to read a card 3.

The same device has a graphics card 108 to which are connected a screen 5 and a video device 6, such as a video recorder or a moving picture camera, for example.

The device 1 has an input/output card 109 to which are connected for example a keyboard 7, a mouse 8, a camera 9 and a printer 10.

The device 1 has an audio card 110 to which an audio device 11 is connected, such as a microphone, for example.

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and possibly removable, stores a program implementing the method according to the invention.

The communication bus 101 affords communication between the different elements included in the microcomputer 10 or connected to it. The representation of the bus 101 is not limiting and, in particular, the central processing unit 100 is able to communicate instructions to any component of the microcomputer 1 directly or by means of another element of the microcomputer 1.

According to the first aspect of the invention, when the device is in a server terminal, it has, for describing a function applicable to a computer object, the function being invocable in a first markup language, the function initially being expressed in a predetermined programming language different from the first markup language, means of defining a first tag describing the function, in the first markup language, means of defining second tags describing the arguments of the function, these tags being contained in the first tag describing the function and the types of the arguments being expressed in a second markup language, and, if the function produces a result, means of defining a third tag describing the result of the function, this tag being contained in the first tag describing the function and the type of the result being expressed in the second markup language.

According to the first aspect of the invention, when the device is in a client terminal, it has, for the obtaining, by a client terminal, of an interface of an object, means of translating said interface into a programming language different from the markup language.

According to the second aspect of the invention, when the device is in a server terminal, it comprises, for the description in a schema language associated with a markup language of a function applicable to a computer object, with the function being initially expressed in a predetermined programming language different from the schema language:

means for defining an element describing the function, in said schema language, means for defining the arguments of the function, in said schema language, and, if the function produces a result, means for defining the element describing the result of the function, in said schema language.

According to the second aspect of the invention, when the device is in a client terminal, it comprises, for obtaining an interface of an object by a terminal client, with said interface comprising at least one function described by the device in the server terminal, means for translating said interface into a programming language that is different to the schema language.

The operation of the computer in the context of the invention is set out below.

The invention also relates to a computer program adapted to implement the invention. This program can use any programming language, and be in the form of source code, object code, or code that is intermediate between source code and object code such as in a partially compiled form, or in any other form desirable for implementing a method according to the invention. The computer program can be in or on a data carrier which can be any entity or device capable of storing the program.

Figure 2:
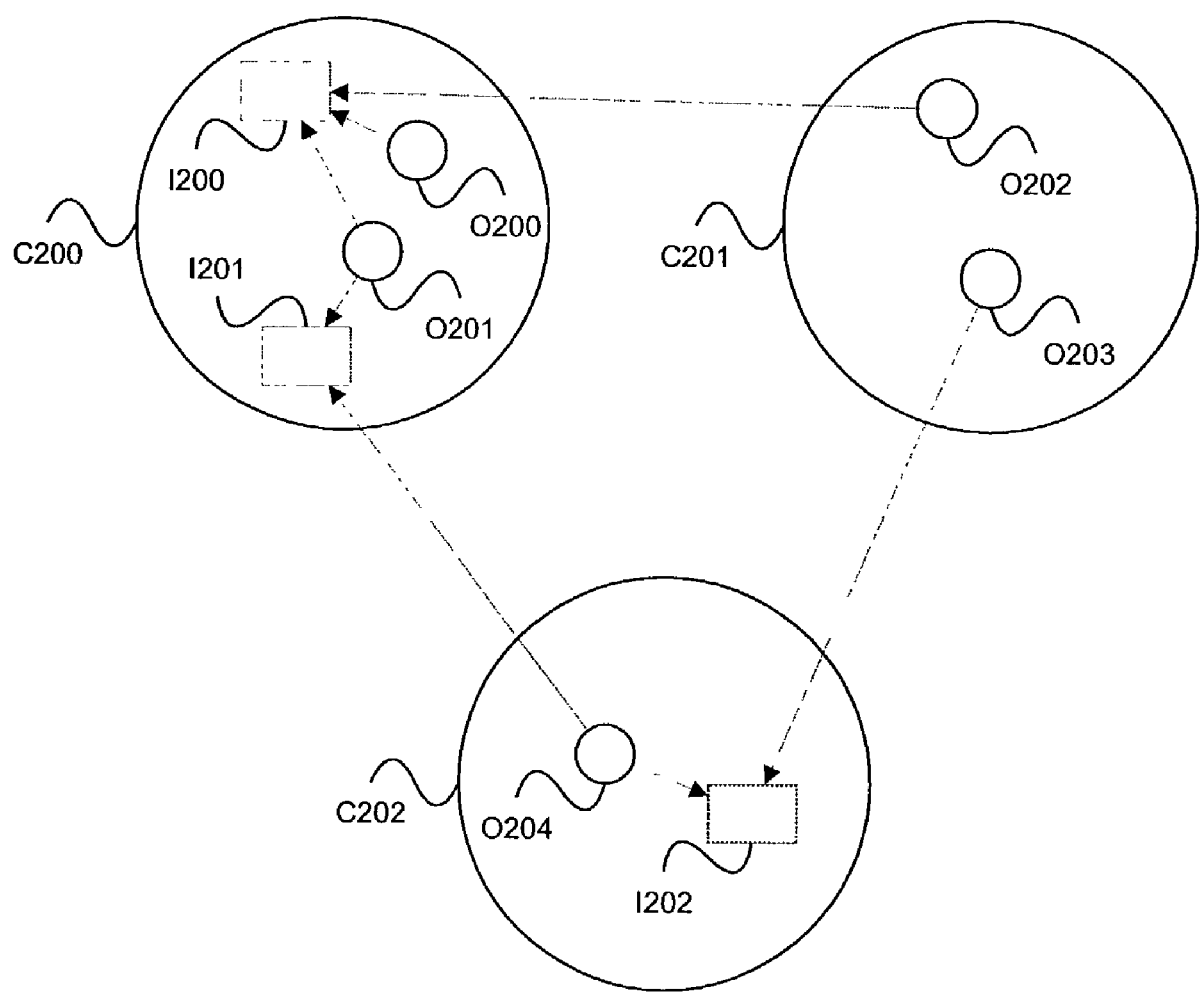
FIG. 2 shows a network of computers implementing the invention.

With reference to FIG. 2, three computers C200, C201, and C202 corresponding to the computer described with reference to FIG. 1 supply services through the intermediary of the objects O200, O201, O202, O203 and O204.

The list and the features of the functions applicable to the objects are described by the interfaces I200, I201 and I203. An object refers to the interfaces which describe the functions which are applicable to it. An object can refer to a single interface, for example the object O200 refers only to the interface I200. An object can also refer to a several interfaces, for example the object O201 refers to the interfaces I200 and I201. An object can refer to an interface present on the same computer or on a remote computer.

With reference to FIG. 3, an object is described by a document 300 written in a markup language, for example an XML language. The document 300 here is an XML document.

The document 300 refers to a document representing an interface 301.

According to the first aspect of the invention, the document 301 is written in the markup language, but a typing resulting from a schema language associated with the markup language used is introduced in order to define the type of the arguments and of the result of the functions.

According to the second aspect of the invention, the document 301 is written in a schema language associated with the markup language used. The document 301 here is an XML schema.

A function invocation applicable to the object represented by the XML document 300 is represented by an XML document 302. When the function invocation produces a result, the latter is represented by an XML document 303.

In the first aspect of the invention, the interface description document 301 makes it possible to validate the documents 302 and 303, that is to say to verify that their structure conforms to that defined by the XML schema representing the interface.

In the case of a function invocation, the validation makes it possible in particular to verify that the number of arguments passed is correct, that the type of arguments (integer, string, real, etc.) is correct and that the constraints on the value of the arguments (value range, etc.) are respected.

FIG. 4a shows examples of XML documents used in the first aspect of the invention.

The document 400a is the description of an object called an image. This object contains a reference to its interface, in the form of an attribute of the main element (image). The value of this attribute is the URI (Universal Resource Identifier) of the interface.

By extracting this URI from the definition of the object, it is possible to obtain, by a connection via the Internet, the description of the interface of the object.

If the functions applicable to the object are described by several interfaces, the attribute interface will have as its value the list of the URIs of these interfaces.

The interface referenced by the object is described by the XML document 410a.

The parts 411a, 412a and 413a correspond respectively to the descriptions of three functions called "getDimension", "setDimension" and "rotate".

As shown by the document 410a, an interface is defined by a tag known as the "interface" and having two attributes:
  "name" for defining the name of the interface, and
  "href" for defining the URI of the interface.

As represented by the parts 411a, 412a and 413a of the document 410a, a function is defined by a tag. The name of this tag is the name of the function and is situated inside the tag describing the interface.

An argument of a function is described by a tag whose name is the name of the argument and which is inside the tag describing the function. Thus the part 412a of the document 410a describes a function "setDimension" having an argument "dimension", and the part 413a of the document 410a describes a function "rotate" having an argument "angle".

If an argument has a predefined type in the XML schema language, this type is specified by adding an attribute to the tag describing this argument. For example, in the part 413a of the document 410a, the type of the argument "angle" is the integer type and specified by the attribute "type="xs:integer"".

Otherwise a type definition is added inside the tag defining the argument. This definition forms part of the typing of an XML schema language. For example, in the part 412a of the document 410a, the type of the argument "dimension" is a complex type.

If the function produces a result, this is defined in the same way as an argument. An attribute "out="true"" is added to the tag defining the result in order to indicate that this tag corresponds to a result and not to an argument. This is the case with the function "getDimension" of the part 411a of the document 410a whose result is "dimension".

The documents 420a and 430a correspond to an invocation and a result of the function named "getDimension" described in the part 411a of the document 410a. The document 440a corresponds for its part to an invocation of the function "rotate" described in the part 413a of the document 410a.

FIG. 4b shows examples of XML documents used in the second aspect of the invention.

Document 400b is the description of an object named image. This object contains a reference to its interface in the form of an attribute of the principal element (image). The value of this attribute is the URI (Universal Resource Identifier) of the Interface.

By extracting this URI from the definition of the object, it is possible to obtain the description of the object interface by a connection via the Internet network.

If the functions applicable to the object are described by several interfaces, value of the attribute interface will be the list of the URI's of these interfaces.

The interface referenced by the object is described by the document 410b. The document 410b corresponds to general definitions that have to be reproduced in all the interface descriptions. It is possible to group these definitions together into a document which will be imported (by an element import) into all the interface descriptions. The role of these definitions will be explained in what follows.

The parts 412b, 413b and 414b correspond respectively to the descriptions of three functions called "getwidth", "getDimension" and "rotate". The parts 412b and 413b comprise both the description of a function invocation and the result of this invocation. The part 414b only contains the description of a function invocation, the function "rotate" not giving any result.

A function invocation or a function result is described using an XML element definition. The use of an XML schema language makes it possible to describe the structure of a function invocation (list of the parameters and their type) or a function result (type of result). Two aspects cannot be specified using this standard: knowing if an XML element definition corresponds to a function invocation or to a result and knowing the result corresponding to a function invocation.

An element describing a function invocation has a type deriving from the type "function" defined in the part 411b of the document 410b. This type "function" makes it possible to determine which XML element definitions correspond to function invocations in the document 410b.

Moreover, the definition of an element describing a function invocation can contain a supplementary attribute named "image:resultType" for indicating which element describes the result of this invocation. This attribute is defined in the part 411b of the document 410b. Its absence indicates that the function gives no result. Thus the result of the function named "getWidth" is described by the element named "width", whereas the function named "rotate" gives no result.

In variant form, a function invocation and a result are linked by virtue of the documentary elements of the XML schema language. A first variant consists of adding documentation to each function description to indicate which element describes its result:

```
<xsd:element name="getWidth">
    <xsd:annotation>
        <xsd:appInfo>
            <result>width</result>
        </xsd:appInfo>
    </xsd:annotation>
    <xsd:complexType>
        <xsd:complexContent>
            <xsd:extension base="image:function"/>
        </xsd:complexContent>
    </xsd:complexType>
</xsd:element>
```

A second variant consists in adding documentation to the document 410b that links the set of function descriptions with their possible result. It should be noted that this second variant makes it possible to dispense with the use of the "function" type, the elements describing a function being identified in the list constituting the documentation. In the example of document 410b, the added documentation would be:

```
<xsd:annotation>
    <xsd:appInfo>
        <function><call>getWidth</call><result>width</result></function>
        <function><call>getDimension</call><result>dimension</result></function>
        <function><call>rotate</call></function>
    </xsd:appInfo>
</xsd:annotation>
```

The documents 420b and 430b correspond to an invocation and a result of the function named "getDimension" described in the part 413b of the document 410b. These two XML documents can be validated by the document 410b. On the other hand, the document 440b corresponds to an invocation of the function named "rotate" described in part 414b of the document 410b.

FIG. 5 represents a table T stored in the RAM memory 103 of a server computer, for example the computer C200 (FIG. 2). Table T contains the associations between objects and interfaces.

The first column T500 of table T comprises the URI's under which are respectively published the objects. The second column T501 comprises the respective references to the objects published. A reference directs to the internal representation of an object in the RAM 103 of the computer C200.

The third column T502 comprises the URI's of the interfaces describing respectively the functions applicable to the objects.

Thus, a line of the table T comprises the URI under which an object is published, a reference to the published object and the URI of an interface describing the functions applicable to the object. If the functions applicable to an object are described by several interfaces, the table T comprises as many lines respectively linking this object and each of its interfaces.

FIG. 6 represents a table T' stored in the RAM memory 103 of a server computer, for example the computer C200 (FIG. 2). The table T contains the associations between the interfaces and their representation in XML language in the first aspect of the invention or in XML schema language in the second aspect of the invention.

The first column T'500 of table T' comprises the URI's under which are respectively published the interfaces. It should be noted that these URI's reappear in column T502 of the table T. The second column T'501 comprises the respective representations in XML language (first aspect) or in XML Schema (second aspect) of each interface in text file form.

The third column T'502 comprises the internal representations of the interfaces, for example in C or C++ language.

Thus, a line of the table T' comprises the URI under which is published an interface, the representation in XML language (first aspect) in XML Schema (second aspect) of this interface and the internal representation of the interface.

FIG. 7a depicts one embodiment of a description of an interface in a markup language, according to the first aspect of the invention. This method is implemented in a server and includes steps E1 to E12.

The method is implemented in the form of an algorithm which can be stored in whole or in part in any information storage means capable of cooperating with the microprocessor. This storage means can be read by a computer or by a microprocessor. This storage means is integrated or not into the device, and may be removable. For example, it may include a magnetic tape, a diskette or a CD-ROM (fixed-memory compact disc).

As stated above, the markup language is more particularly the XML language and a schema language associated with it is the XML schema language.

Step E1 is the obtaining of the interface to be described, for example by reading in memory. The interface is a set of functions which can be applied to a computer object. The interface is expressed in a predetermined known programming language, which is different from the XML language and may be any language, for example C or C++ language.

The functions of the interface are now considered successively.

The following step E2 is the selection of a first function.

The following step E3 is the creation of a definition "empty" of the current function. This definition is expressed in XML language, in the form of a tag:

<getwidth>

</getWidth>

The name of the tag is the name of the current function, for example here the function "getWidth".

The following step E4 is a test for determining whether the current function has at least one argument.

When the response is positive, then this step is followed by step E5, which is the selection of a first argument of the current function.

At the following step E6, a definition of the current argument is created in XML schema language by adding a tag whose name is that of the current argument inside the tag created at step E3.

If the type of the argument is predefined in the XML schema language, an attribute:

type="..."

is added to the tag defining the current argument and the algorithm in FIG. 8 is not used.

In the contrary case, the definition of the type is constructed as disclosed hereinafter with reference to FIG. 8 and is inserted in the tag defining the current argument.

The following step E7 is a test for determining whether there remains at least one argument of the current function to be processed. When the response is positive, step E7 is followed by step E8, at which a following argument is considered. Step E8 is followed by the previously described step E6.

When the response is negative at step E7, that is to say there is no more argument to be considered, step E7 is followed by step E9. Likewise, when the response is negative at step E4, this step is followed by step E9.

Step E9 is a test for checking whether the invoking of the current function produces a result.

When the response is positive, then this step is followed by step E10, to which a definition of the result is created in XML schema language by adding a tag whose name is that of the result inside the tag defining the current function. To this tag there is added an attribute "out="true"" to signify that it corresponds to a result and not to an argument.

If the type of the result is predefined in the XML schema language, an attribute:

type="..."

is added to the tag defining the result and the algorithm in FIG. 8 is not used.

In the contrary case, the definition of the type is constructed as disclosed hereinafter with reference to FIG. 8 and is added inside the tag defining the result.

The following step E11 is a test for determining whether there remains at least one function to be processed. When the response is positive, step E11 is followed by step E12, at which a following function is considered. Step E12 is followed by the previously described step E3.

When the response is negative at step E9, that is to say an invocation of the current function does not produce any result, step E9 is followed by step E11.

When all the functions of the current interface have been processed, the response to step E11 is negative and the processing is terminated. Naturally, the interface is stored in the previously described table T'.

FIG. 7b represents an embodiment of the description of an interface in a schema language associated with a markup language, according to the second aspect of the invention. This method is implemented in a server and comprises the steps S1 to S12.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

As stated earlier, the markup language is more particularly the XML language and the associated schema language is the XML schema language.

Step S1 is the obtaining of the interface to be described, for example by reading from memory. The interface is a set of functions which may be applied to a computing object. The interface is expressed in any known predetermined programming language, different to the XML schema language, for example in C or C++ language.

The functions of the interface will now be considered in turn.

The following step S2 is the selection of a first function.

The following step S3 is the creation of an "empty" definition of the element describing the current function. This definition is expressed in XML schema language, in the form:

```
<xs:element name="...">
    <xsd:complexType>
        <xsd:complexContent>
            <xsd:extension base="image:function">
            </xsd:extension>
        </xsd:complexContent>
    </xsd:complexType>
</xsd:element>
```

The first line is completed with the name of the current function which is inserted as the value of the attribute "name".

The following step S4 is a test to determine if the current function has at least one argument.

When the response is positive, step S4 is followed by step S5 which is the selection of a first argument of the current function.

At the following step S6, a definition of the current argument is created in XML schema language and added to the definition created at step S3.

Step S6 is described in detail below.

The following step S7 is a test to determine if there remains at least one argument to be processed.

When the response is positive, this step is followed by the step S8 at which a following argument is considered. This step is followed by the step S6 already described.

When the response is negative at step S7, that is to say there is no argument left to consider, step S7 is followed by the step S9. Similarly, when the response is negative at step S4, this step is followed by the step S9.

Step S9 is a test to verify if the invocation of the current function gives a result.

When the response is positive, this step is followed by the step S10 at which a definition of the result is created in XML schema language.

The first line of the definition of the current function is then completed by adding an attribute "image:resultType" of which the value is the name of the element describing the result:

<xsd:element name="..." image:result Type="...">

The creation of the definition of the result is next similar to step S6 and will be described in detail below.

Step S10 is followed by a step S11 which is a test to verify if there remains at least one function to be processed. Similarly, when the response is negative at step S9, that is to say an invocation of the current function does not give any result, step S9 is followed by the step S11.

When the response is positive at step S11, this step is followed by the step S12 in order to consider a following function. This step is followed by the step S3 already described.

When all the functions of the current interface have been processed, the response at step S11 is negative and the processing is terminated. Naturally, the interface is stored in the table T' already described.

The definition of a new type (FIG. 7a, first aspect of the invention) is now detailed with reference to FIG. 8a, in the form of an algorithm including steps E70 to E81.

The figure is described hereinafter with reference to an argument, but the steps are identical in order to describe a function result.

Step E70 is a test for checking whether the type to be defined is complex. A complex type is composed of several fields. Each field has its own type.

When the response is positive, this means that the current type has several fields and this step is followed by step E71, at which a complex type definition is created in XML schema language.

The following step E72 is the selection of a first field of the current type.

At the following step E73, a tag for defining the field is created in XML schema language. If the type of the field is a predefined type, it is specified in the tag by an attribute "type=". . ."". Otherwise the description of the type is added inside the tag, once again invoking the algorithm in FIG. 8. In other words, in the latter case, step E73 switches to step E70.

The following step E74 is a test for checking whether there remains at least one field of the current complex type to be processed.

When the response is positive, then this step is followed by step E75, at which a following field is considered. Step E75 is followed by the previously described step E73.

When all the fields of the current complex type have been described in XML schema language, that is to say when the response is negative at step E74, then the processing of the current type is terminated.

When the response is negative at step E70, the current type is not complex. In this case, this step is followed by step E76, which is a test for verifying whether the type is a collection. A collection is a set of values of the same type.

When the response is positive, then this step is followed by step E77, at which a definition of the collection type is created in XML schema language.

At the following step E78, a tag for defining the content of the collection is created in XML schema language. If the type of the content of the collection is a predefined type, it is specified in the tag by an attribute "type=". . .". Otherwise the description of the type is added inside the tag, once again invoking the algorithm in FIG. 8. In other words, in the latter case, step E78 switches to step E70.

When the response is negative at step E76, this step is followed by step E79, which is a test for determining whether the current argument has a simple type, that is to say one having neither attribute nor sub-element. Simple types are for example an integer, an integer between 1 and 10, a character string of 7 characters.

When the response is positive, this step is followed by step E80, which is the creation of a definition of an element having this simple type.

When the response is negative at step E79, this step is followed by step E81, which is the creation of an element definition corresponding to a remote reference. This element contains a URI from which the referenced object can be downloaded.

In a variant, the type description is produced in the following manner.

Only the predefined types are taken from the XML schema language. A complex type is then described inside the tag of the element having this complex type. Inside this tag, each field of the complex type is defined by a tag whose name is that of the field. If the field has a predefined type, it is indicated by an attribute "type=". . ."". Otherwise, the type of field is complex and is described recursively inside the tag describing the field.

For example, according to this variant, a function called "asThumbnail" is described thus:

```
<asThumbnail>
    <thumbnail out="true">
        <width type="xs:integer"/>
        <height type="xs:integer"/>
        <pixels type="xs:base64"/>
    </thumbnail>
</asThumbnail>
```

This is to be interpreted in the following manner: the function "asthumbnail" has a single argument, called "thumbnail", whose type is complex and which is composed of three fields, "width", "height" and "pixels" having respectively the predefined types "xs:integer", "xs:integer" and "xs:base64".

Steps S6 and S10 (FIG. 7b, second aspect of the invention) will now be detailed with reference to FIG. 8b, in the form of an algorithm comprising the steps S70 to S81.

The description in XML schema language of an argument or a result is carried out according to its type. The Figure is described below with reference to an argument, but the steps are identical for describing a function result.

Step S70 is a test to verify if the type of the current argument is complex. A complex type is composed of several fields. Each field has its own type.

When the response is positive, this means that the current argument comprises several fields and this step is followed by the step S71 at which an element definition corresponding to this complex type is created in XML schema language.

The following step S72 is the selection of a first field of the current argument.

At the following step S73, a definition of the field is created in XML schema language and added to the definition of the current type.

Step S73 is an invocation of the type description algorithm in XML schema language. In other words, step S73 links onto step S70 to deal with the current field according to its type.

The following step S74 is a test to verify if there remains at least one field of the argument of complex current type to be processed.

When the response is positive, this step is followed by the step S75 at which a following field is considered. Step S75 is followed by the step S73 already described.

When all the fields of the argument of complex current type have been described in XML schema language, that is to say when the response is negative at step S74, then the processing of the current argument is terminated.

When the response is negative at step S70, the type of the current argument is not complex. In this case, this step is followed by the step S76 which is a test to verify if the type is a collection. A collection is a set of values of the same type.

When the response is positive, this step is followed by the step S77 at which a definition of element corresponding to this collection type is created in XML schema language.

At the following step S78, a nested element definition is created in XML schema language and added to the definition of the current collection type.

Step S78 is an invocation of the type description algorithm in XML schema language. In other words, step S78 links onto step S70 to deal with the nested element according to its type.

Thus, for example, an integer table is described by the definition:

```
<xs:element name=" integerTable">
    <xsd:complexType>
        <xsd:sequence
            minOccurs="0" maxOccurs="unbounded">
            <xsd:element name="element"
type="xsd:integer"/>
        </xsd:sequence>
    </xsd:complexType>
</xsd:element>
```

When the response is negative at step S76, this step is followed by step S79 which is a test to determine if the current argument as a known simple type, that is to say corresponding to a type defined by the XML schemas.

An element of simple type does not comprise any attribute or sub-element. Known simple types are for example integers, real numbers, and strings.

When the response is positive, this step is followed by the step S80 which is the creation of an element definition having this simple type.

When the response is negative at step S79, this step is followed by the step S81 which is the creation of an element definition corresponding to a remote reference. This element contains a URI from which the referenced object can be downloaded.

FIG. 9 shows a table Tc' analog to the table T' of FIG. 6, but which is stored in the RAM memory 103 of a client computer.

Table Tc' enables the client computer to keep the descriptions of the interfaces which he encounters.

At the same time the interfaces are stored in memory in description form in XML language in the first aspect of the invention or in XML schema in the second aspect of the invention which is the description as obtained by the client computer from the server computer and in internal form, this description being reconstructed from the description in XML language (first aspect) or in XML schema (second aspect).

FIG. 10 shows a method of obtaining interfaces of an object by a client computer, in the form of an algorithm comprising the steps S20 to S29. The object of this method is to obtain the set of the interfaces describing the functions applicable to an object.

This algorithm may be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S20 is the reception of the description of an object in the form of an XML document for example in response to a request. The client computer receives the document 400a (FIG. 4a, first aspect of the invention) or the document 400b (FIG. 4b, second aspect of the invention) for example.

The following step S21 is the extraction of the URI of a first interface from the XML document. For example, from the document 400a or 400b is extracted from the document 400aand 400b.

The following step S22 is a test for determining if the current interface is stored in the table Tc' (FIG. 9) present in the RAM memory of type client computer.

When the response is negative, step S22 is followed by step S23 at which a request is sent to the address defined by the URI previously obtained for obtaining the XML document describing the interface (first aspect of the invention) or the description in XML schema of the interface (second aspect of the invention).

In the first aspect of the invention, the following step S24 is the reception of the XML document describing the interface. For example, the document 410a is received by the client computer.

In the second aspect of the invention, the following step S24 is the reception of the description of the interface in XML schema. For example, the document 410b is received by the client computer.

At the following step S25, the XML document (first aspect of the invention) or the XML schema (second aspect of the invention) of the current interface is stored in the table Tc'.

The following step S26 is the translation of the XML document (first aspect of the invention) or of the XML schema (second aspect of the invention) of the current interface into internal language such as for example C or C++, in order to obtain an internal description.

At the following step S27, the internal description of the current interface is stored in the table Tc'.

Step S27 is followed by a step S28 which is a test to determine if there remains at least one interface to be processed. If the response is positive, this step is followed by the step S29 at which the URI of a following interface is extracted. Step S29 is followed by the step S22 already described.

When the response is positive at step S22, this step is also followed by the step S28.

When the response is negative at step S28, then the set of interfaces describing the functionalities of an object had been obtained by the client computer.

Of course, the present invention is in no way limited to the embodiments described and represented, but encompasses, on the contrary, any variant form within the capability of the person skilled in the art.

The invention claimed is:

1. A method of describing a function used to manipulate data of a computer object, the function being invokable in a first markup language and being initially expressed in a predetermined programming language different from the first markup language, the method comprising the steps of:

defining (E3) a first tag describing the function, defining (E6) second tags describing arguments of the function, the second tags being contained in the first tag describing the function; and, if the function produces a result, defining (E10) a third tag describing the result of the function, the third tag being contained in the first tag describing the function, wherein the first, second and third tags are in the first makeup language;

wherein at least one of the second and third tags contain at least a fourth tag in a second markup language, of schema type, said fourth tag defining the type of the corresponding argument or result, said second markup language being associated with the first markup language; and outputting the function to manipulate data.

2. A method according to claim 1, wherein the associated schema language is a markup language that enables construction of a complex type by an aggregation of predefined simple types and wherein said fourth tag is used to define said aggregation.

3. A method according to claim 1, wherein the third tag is differentiated from the second tags by an attribute with a specific value.

4. A method according to claim 1,
wherein at least one function forms part of an interface, and wherein the method further comprises the step of storing the interface in the markup language or in the programming language.

5. A method for obtaining, by a client terminal, an interface of an object, the interface having at least one function described by the method of claim 1, said method for obtaining comprising the step of translating (S26) the interface into a programming language different from the markup language.

6. A method for obtaining according to claim 5, further comprising the step of storing the interface in the markup language or in the programming language.

7. A method of describing according to claim 1, wherein the markup language is an XML language and the associated schema language is an XML schema language.

8. An information carrier device storing a computer program for implementing a method according to claim 1, when the program is loaded and executed in a computer system.

9. A device for determining a function used to manipulate data of a computer object, the function being invocable in a first markup language and being initially expressed in a predetermined programming language different from the first markup language, the device comprising:

means for defining a first tag describing the function,
means for defining second tags describing arguments of the function, the second tags being contained in the first tag describing the function; and
means for defining a third tag describing, if the function produces a result, the result of the function, the third tag being contained in the first tag describing the function,
wherein the first, second and third tags are in the first markup language; and
wherein at least one of the second and third tags contains at least a fourth tag in a second markup language, of schema type, said fourth tag defining the type of the corresponding argument or result, said second markup language being associated with the first markup language.

10. An electronic file stored in a computer-readable medium, said file determining a function used to manipulate data of a computer object, wherein the function is capable of being invoked in a first markup language, the file comprising:

a first tag describing the function;
second tags describing arguments of the function, the second tags being contained in the first tag describing the function; and
if the function produces a result, a third tag describing the result of the function, the third tag being contained in the first tag describing the function,
wherein the first, second and third tags are in the first markup language; and
wherein at least one of the second and third tags contains at least a fourth tag defining the type of the corresponding argument or result in a schema language associated with the first markup language.

* * * * *

UNITED STATES PATENT AND TRADEMARK OFFICE
CERTIFICATE OF CORRECTION

PATENT NO. : 7,299,449 B2  
APPLICATION NO. : 10/186753  
DATED : November 20, 2007  
INVENTOR(S) : Hervé Ruellan et al.

Page 1 of 1

It is certified that error appears in the above-identified patent and that said Letters Patent is hereby corrected as shown below:

COLUMN 4

Line 57, "is" should be deleted.

COLUMN 16

Line 4, "from" should be deleted;  
Line 6, "400*a*and 400b" should be deleted;  
Line 52, "invokable" should read --invocable--; and  
Line 64, "makeup" should read --markup--.

Signed and Sealed this

Thirtieth Day of September, 2008

JON W. DUDAS  
*Director of the United States Patent and Trademark Office*